June 10, 1924.
C. E. SINGLETON
TIRE TOOL
Filed Jan. 30, 1919
1,497,034
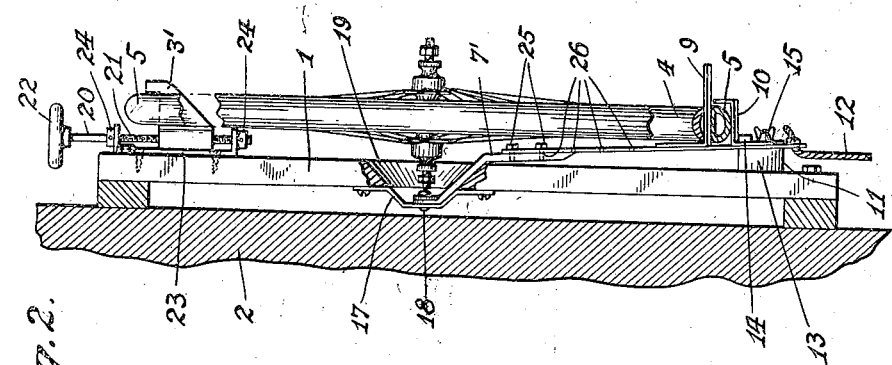
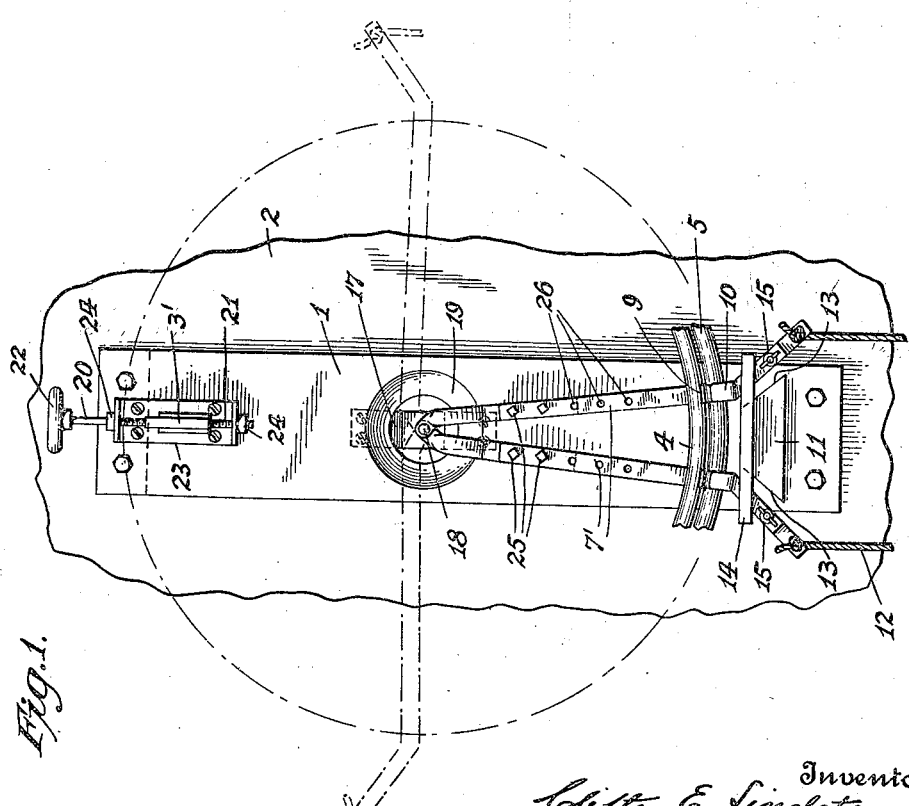
Inventor
Clifton E. Singleton
By his Attorney Patented June 10, 1924.

1,497,034

UNITED STATES PATENT OFFICE.

CLIFTON E. SINGLETON, OF BROOKLYN, NEW YORK.

TIRE TOOL.

Application filed January 30, 1919. Serial No. 273,963.

*To all whom it may concern:*

Be it known that I, CLIFTON E. SINGLETON, a citizen of the United States, and a resident of the borough of Brooklyn, in the city and State of New York, county of Kings, have invented certain new and useful Improvements in Tire Tools, of which the following is a specification.

The present invention relates to tire tools and has for its object the production of means for quickly and easily guiding a tire into peripheral engagement with the wheel rim and consists of the hereinafter described means.

In the accompanying drawing, the invention is disclosed in one concrete and preferred embodiment, in which—

Fig. 1 is a front elevation of the tire tool embodying the invention and with the wheel to be supported indicated diagrammatically.

Fig. 2 is an edge view of the parts shown in Fig. 1 with portions broken away and in section.

1 indicates a support of any suitable character here shown as a board attached in an upright position to the wall 2, and provided with a support hook 3' on which the wheel rim 4 is suspended in an upright position. 5 is a tire to be mounted on the rim which, in practice, is placed partly around the rim by hand with the valve stem inserted through the rim and attached thereto in a manner well understood. 7' indicates two members or arms pivotally supported on a common center indicated by a pivot 18. Each of these arms carries a tire stretching member 9 extending laterally between the rim and the tire and a tire guiding member 10 that embraces the tire and moves it into the plane of the rim. 11 is a stop at the lower part of support 1, and 12 denotes a flexible connection for actuating simultaneously arms 7'. It will be understood that in order to provide clearance for the hub of the wheel and admit of arms 7' being mounted substantially concentric with the hub of the wheel, pivot 18 is in a vertical plane different from that of the wheel and hub. In the form here shown, support 1 is provided with an opening 19 through which extend arms 7', the bracket 17 being secured to the rear of support 1 as indicated. In order to adjust the position of the wheel with respect to the center 18, hook member 3' is adjustable by means of a vertical rod 20 that has a threaded portion 21 passing through a threaded orifice in hook member 3'. The rear surface of hook member 3' slides against the front surface of bracket 23 carried by support 1 and rod 20 is held in said bracket by means of collars 24. 22 indicates an operating handle for adjusting screw 21.

It will be understood that the tire is placed partly on the rim and the latter is then hung on the hook member 3'. Tire stretching member 9 is now inserted between the tire and rim while guiding member 10 embraces the tire. It will now be understood that as rope 12 is manipulated, as by stepping on it, arms 7' will swing downwardly from the dotted position indicated in Fig. 1 until guide members 10 are brought against abutment surface 13 of stop 11 and behind guard 14. This action will guide the tire into position on the rim. Preferably, guiding members 10 are adjustably mounted on arms 7' by means of slot and set screw connection 15 so that after the tire has been mounted on the rim, the guiding members may be swung out of the way after which the wheel as a whole may be removed by lifting it from hook 3' and by sliding it off stretching member 9.

I claim:

1. A tire tool comprising: a wheel support, a tire stretching member entering between the tire and the rim and extending clear across the width of the rim, a tire guiding member engaging with the side of the tire to move the latter into the plane of the rim, and an arm pivotally supported at a point substantially concentric in respect to the axis of the wheel and in a vertical plane different from that of the wheel carrying said members.

2. A tire tool comprising: a support engaging the rim of a wheel to hold it in suspended position, a tire stretching member entering between the tire and the rim, a tire guiding member engaging with the side of the tire to move the latter into the plane of the rim, and an arm pivotally supported at a point substantially concentric in respect to the axis of the wheel and in a vertical plane different from that of the wheel carrying said members.

3. A tire tool comprising: a wheel support having an opening, a bracket at the rear of the wheel support, an arm pivotally mounted on said bracket and extending through said opening to the front side of the support, and a tire stretching and a tire guiding member carried by said arm.

4. A tire tool comprising: a support engaging the rim of a wheel to hold it in suspended position, a plurality of arms pivotally mounted at a common center substantially coincident with the axis of the wheel, tire stretching and tire guiding members carried by said arms, and means for adjusting the position of the wheel support with respect to the center of the pivotal support for the arms to bring the center of wheels having different diameters coincident with the center of the arms.

Signed at New York city, in the county of Kings and State of New York, this 21st day of Dec., 1918.

CLIFTON E. SINGLETON.